Patented Nov. 19, 1929

1,736,088

UNITED STATES PATENT OFFICE

PAUL NAWIASKY, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

1.4-DIAMINO-2-ALKOXY-ANTHRAQUINONE

No Drawing. Application filed April 20, 1927, Serial No. 185,359, and in Germany June 8, 1926.

The present invention relates to 1.4-diamino-2-alkoxy-anthaquinones of the most probable formula:

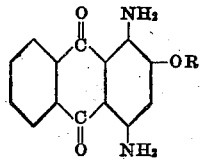

wherein R represents an alkyl group and wherein one or both of the amino groups may be substituted to a process of preparing the same and to compounds of the group including cellulose esters and ethers dyed therewith.

The said dyestuffs may be obtained in any suitable manner. I have found that those of the above-said ethers, in which the amino group or groups are either unsubstituted or contain one or more aliphatic hydrocarbon radicles can be produced with great advantage by introducing an amino group, in the 4-position, into ethers of 1-amino-2-hydroxy-anthraquinones. This may readily be effected by nitrating such ethers of 1-amino-2-hydroxyanthraquinones after having, if necessary, previously protected the amino group, for example by the introduction of acyl groups, such as benzoyl groups, and the like, and then reducing the nitro group. Or the ethers of 1-amino-2-hydroxyanthraquinones may be halogenated, and the halogen in the 4-position then replaced by the amino group. The products thus obtained are not only very valuable dyestuffs for cellulose esters and ethers, but are also valuable original materials for the production of dyestuffs and may also be used as pigment colors.

When dyeing, for instance, a cellulose ester or ether with a 1.4-diamino-2-alkoxy-anthraquinone according to the usual methods, brilliant red to blue shades of excellent fastness are obtainable.

The following examples will further illustrate how my invention may be carried into practical effect but the invention is not limited to these examples. The parts are by weight.

Example 1

25.3 parts of 1-amino-2-methoxyanthraquinone are dissolved in 240 parts of sulfuric acid monohydrate, whereupon 10 parts of dehydrated boric acid are added, followed by 6 parts of paraformaldehyde, the mixture being stirred for about 20 minutes at room temperature. After cooling down to 5° below zero C. 12.5 parts of a nitrating acid, containing 52 per cent of nitric acid free from water and 48% of sulfuric acid monohydrate, are added by drops, at the same temperature, and stirring is continued, at the same temperature for about 1½ hours longer. At the end of that time, the mixture is poured into ice water, filtered, and washed until neutral. The resulting 4-nitro-1-amino-2-methoxyanthraquinone, after being recrystallized from monochlorbenzene, has the melting point of from 246° to 249° C. In order to transform it into the diamino compound, the moist press cakes are heated to boiling for half an hour with a solution of sodium sulfid containing 40 parts of $Na_2S$. The product is then treated in the usual manner.

After recrystallization from monochlorbenzene, the reaction product, which separates out in crystalline form, melts at from 234° to 236° C. The crystals have a bronze sheen, and dissolve to a carmine-red solution in organic solvents.

1.4-diamino-2-ethoxyanthraquinone can be prepared from 1-amino-2-ethoxyanthraquinone in a similar manner.

Example 2

10 parts of 1-benzoylamino-2-methoxyanthraquinone melting at from 238° to 240° C., which may be obtained by benzoylating 1-amino-2-methoxyanthraquinone, are brought into suspension in 50 parts of nitrobenzene, 10 parts of 98 per cent nitric acid being then added. The mixture is stirred and heated at water-bath temperature for 1 hour and then allowed to cool. The deposited yellow crystals melting at from 288° to 289° C. are thoroughly crushed, dissolved in 40 parts of sulfuric acid of 66° Baumé strength and heated on the water bath for an hour and then poured into water; the deposited nitro-compound is reduced as described in Example 1. The resulting product is identical with that obtained in Example 1.

Example 3

10 parts of 4-brom-2-methoxy-1-aminoanthraquinone, melting at from 203° to 204° C. which may be obtained by brominating 1-amino-2-methoxyanthraquinone in glacial acetic acid, are heated, in paste form, with 200 parts of 20 per cent aqua ammonia and 0.2 part of cupric sulfate in an autoclave for about 8 hours at a temperature of from 140° to 150° C. After cooling, the deposited base is filtered by suction and may, if necessary, be further purified by recrystallization from monochlorbenzene.

Example 4

1 kilogram of cellulose acetate silk is dyed in a bath of 20 litres of water containing in suspension 10 grams of the 1.4-diamino-2-methoxyanthraquinone, obtainable according to Example 1 and brought into a state of fine distribution, as for example by redissolving from sulfuric acid, 40 to 60 grams of soap being added to the bath. The silk is preferably entered at a low temperature and finished by gradually raising the temperature to about 75° C. in from ¾ of an hour to 1 hour. The dyeings resemble rhodamine dyeings in shade and possess a fastness and beauty hitherto unattainable with other dyestuffs for cellulose acetate silk.

Similar dyeings are obtained with 2-ethoxy-1.4-diaminoanthraquinone.

What I claim is:

1. As new articles of manufacture, alkyl ethers of 1.4-diamino-2-hydroxy-anthraquinones corresponding to the general formula

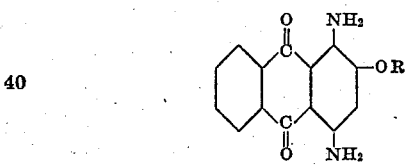

wherein R represents an alkyl group and wherein the amino groups may be substituted.

2. As a new article of manufacture, 1.4-diamino-2-methoxyanthraquinone.

3. The process of producing alkyl ethers of 1.4-diamino-2-hydroxy-anthraquinone compounds which consists in treating a 1-amino-2-alkoxy-anthraquinone compound with formaldehyde in the presence of sulfuric acid, introducing a nitro group into the resulting product, treating the nitrated product with water and reducing the nitro group.

4. As new articles of manufacture the compounds of the most probably formula:

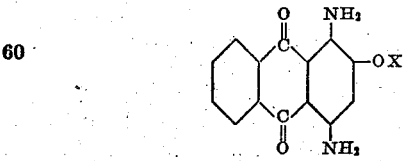

wherein X represents a methyl or ethyl group.

5. Cellulose esters dyed with a product defined in claim 1.

6. Cellulose esters dyed with a product defined in claim 4.

7. Cellulose esters dyed with the product defined in claim 2.

In testimony whereof I have hereunto set my hand.

PAUL NAWIASKY.